(12) United States Patent
Chauhan et al.

(10) Patent No.: US 7,957,084 B2
(45) Date of Patent: Jun. 7, 2011

(54) EXTRACTION OF TRANSDUCER POSITION INFORMATION FROM BIT PATTERNED MAGNETIC MEDIA

(75) Inventors: Sundeep Chauhan, Edina, MN (US); Barmeshwar Vikramaditya, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/025,222

(22) Filed: Feb. 4, 2008

(65) Prior Publication Data

US 2009/0195916 A1    Aug. 6, 2009

(51) Int. Cl.
*G11B 5/02* (2006.01)
(52) U.S. Cl. ......................................... 360/55
(58) Field of Classification Search ............... 360/77.06, 360/75, 51, 77.08, 2, 135, 55
See application file for complete search history.

(56) References Cited

U.S. PATENT DOCUMENTS

| | | | |
|---|---|---|---|
| 5,136,439 A | 8/1992 | Weispfenning et al. | |
| 5,668,678 A | 9/1997 | Reed et al. | |
| 5,739,972 A | 4/1998 | Smith et al. | |
| 6,005,363 A | 12/1999 | Aralis et al. | |
| 6,181,505 B1 | 1/2001 | Sacks et al. | |
| 6,233,106 B1 | 5/2001 | Chambers | |
| 6,525,897 B2 * | 2/2003 | Despain et al. | 360/77.06 |
| 6,643,082 B1 | 11/2003 | Belser | |
| 6,643,090 B1 | 11/2003 | Pruett | |
| 6,657,809 B2 | 12/2003 | Ottesen et al. | |
| 6,678,110 B2 | 1/2004 | Ellis | |
| 6,751,035 B1 | 6/2004 | Belser | |
| 6,754,017 B2 * | 6/2004 | Rettner et al. | 360/51 |
| 7,009,805 B2 * | 3/2006 | Wong et al. | 360/77.06 |
| 7,161,753 B2 | 1/2007 | Wachenschwanz et al. | |
| 2002/0132083 A1 | 9/2002 | Weller et al. | |
| 2005/0157597 A1 | 7/2005 | Sendur et al. | |
| 2007/0092650 A1 | 4/2007 | Albrecht et al. | |
| 2009/0002875 A1 * | 1/2009 | Lee et al. | 360/77.08 |
| 2009/0040652 A1 * | 2/2009 | Moser et al. | 360/77.08 |
| 2009/0046385 A1 * | 2/2009 | Yamamoto | 360/2 |
| 2009/0097156 A1 * | 4/2009 | Yamamoto | 360/77.08 |
| 2009/0097160 A1 * | 4/2009 | Yamamoto | 360/135 |

* cited by examiner

*Primary Examiner* — Fred Tzeng
(74) *Attorney, Agent, or Firm* — David K. Lucente

(57) ABSTRACT

Extracting transducer position information from bit patterned magnetic media includes providing a magnetic storage medium having at least one data array with multiple discrete and separated recording bits and providing the transducer adjacent the data array. A readback signal dependent upon the multiple recording bits is generated with the transducer. Determining the transducer position information further includes generating at least a first position signal and a second position signal from the readback signal.

20 Claims, 7 Drawing Sheets

EXTRACTION OF TRANSDUCER POSITION INFORMATION FROM BIT PATTERNED MAGNETIC MEDIA

BACKGROUND

Magnetic storage devices generally store data on a magnetic storage medium through the use of a transducer that writes and reads magnetic data respectively to and from the magnetic storage medium. For example, a disk storage device can include one or more magnetic recording disks that are coaxially mounted on a spindle motor for high-speed rotation. As the disks rotate, one or more transducers, i.e., read and/or write heads, are moved across the surfaces of the disks by an actuator assembly to write and read digital information respectively to and from the magnetic recording disks.

The magnetic storage medium in a magnetic storage device can be organized into one or more data arrays. The surface of a magnetic recording disk in a disk storage system, for example, can be divided into a plurality of concentrically spaced data tracks, generally perpendicular to the radius of the disk. The data tracks on the disk can be further organized into multiple data sectors. Data is often stored within the sectors along the data tracks in the form of a series of magnetic transitions recorded or induced by the head.

Magnetic storage devices often include a control system for accurately and reliably recording and reading data. For example, a disk storage device usually includes a closed-loop servo control system to control the movement of the head across the surface of the magnetic recording disks. To reliably write data to and read data from a desired data track in a magnetic recording disk, the head is positioned over the center of the data track as the track rotates beneath the head. To position the head during one operation, the servo control system first performs a seek function in which the head is moved from its current position to the specified data track. Upon reaching the destination data track, the servo control system performs a tracking function in which the head's position is monitored and adjusted to ensure that the head is following the center of the data track.

The servo control system generally receives a servo information signal from a head indicating the position of the head as the head passes over one or more servo sectors on the disks. The servo control system then processes the servo information signal to determine the current position of the head and the movements to adjust the position of the head, if necessary. Disk storage devices generally employ either dedicated servo systems, in which a separate disk is dedicated to storing servo information, or an embedded servo system in which servo sectors are positioned between data sectors on a single disk. A servo sector may include sector and track identification codes as well as servo burst patterns used to maintain the head's position over the center of the data track.

Given the general desire to store ever-increasing amounts of digital information, designers and manufacturers of magnetic storage devices are continually attempting to increase the bit density of magnetic storage media. In a magnetic recording disk this means increasing the areal density, i.e., both the number of tracks on a disk and the number of bits along a given track. New materials, as well as new recording methods, have helped increase the areal density. For example, bit patterned media, in which a plurality of separated data bits are patterned in the magnetic storage medium, generally allows data bits to be positioned closer together than in a continuous magnetic medium. Servo information, however, must still be included on the disks to provide positioning information for a servo control system. In addition to the complexity of the servo patterning process and subsequent processing cost of the bit patterned media production, the presence of the servo sectors further reduces the area available for recording data.

SUMMARY

Determining a transducer's position relative to a magnetic storage medium includes generating at least a first position signal and a second position signal from a readback signal generated by the transducer. The magnetic storage medium has at least one data array with a plurality of discrete and separated recording bits. The transducer is provided adjacent the at least one data array and the readback signal generated by the transducer is dependent upon the plurality of recording bits of the at least one data array. These and various other features and advantages will be apparent from a reading of the following detailed description.

DETAILED DESCRIPTION OF THE PREFERRED EMBODIMENTS

Figure 1:
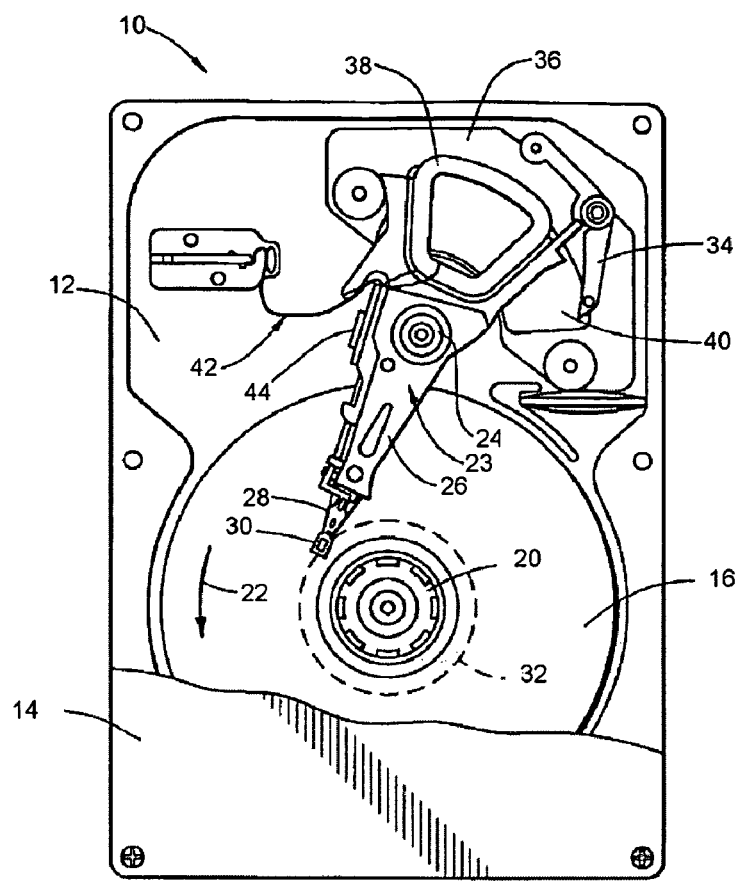
FIG. 1 is a top plan view of a magnetic storage device according to an embodiment of the present invention.

The following detailed description should be read with reference to the drawings, in which like elements in different drawings are numbered identically. Embodiments shown in the drawings are not necessarily to scale, unless otherwise noted. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

FIG. 1 is a top plan view of a magnetic storage device 10, which in the embodiment shown, takes the form of a disk drive of the type used to interface with a host computer to magnetically store and retrieve user data. The disk drive includes various components mounted to a base 12. A top cover 14 (shown in partial cutaway fashion) cooperates with the base 12 to form an internal, sealed environment for the disk drive.

The magnetic storage device 10 includes magnetic storage media for recording data. In the embodiment shown in FIG. 1, the media takes the form of a plurality of axially-aligned, magnetic recording disks 16 mounted to a spindle motor (shown generally at 20) for rotating at a speed in rotational direction 22. An actuator 23, which rotates about a bearing shaft assembly 24 positioned adjacent the disks 16, is used to write and read data to and from tracks (not designated) on the disks 16.

The actuator 23 includes a plurality of rigid actuator arms 26. Flexible suspension assemblies 28 are attached to the distal end of the actuator arms 26 to support a corresponding array of transducers 30 (e.g., read and/or write heads) with one transducer adjacent each disk surface. Each transducer 30 includes a slider assembly (not separately designated) designed to fly in close proximity to the corresponding surface of the associated disk 16. Upon deactivating the disk drive 10, the transducers 30 come to rest on an outer stop 32 and a magnetic latch 34 secures the actuator 23.

A voice coil motor (VCM) 36 is used to move the actuator 23 and includes an actuator coil 38 and permanent magnet 40. Application of current to the coil 38 induces rotation of the actuator 23 about the pivot assembly 24. A flex circuit assembly 42 provides electrical communication paths between the actuator 23 and a disk drive printed circuit board assembly (PCBA) mounted to the underside of the base 12. The flex circuit assembly 42 includes a preamplifier/driver circuit 44 which applies currents to the transducers 30 to read and write data.

Figure 2:
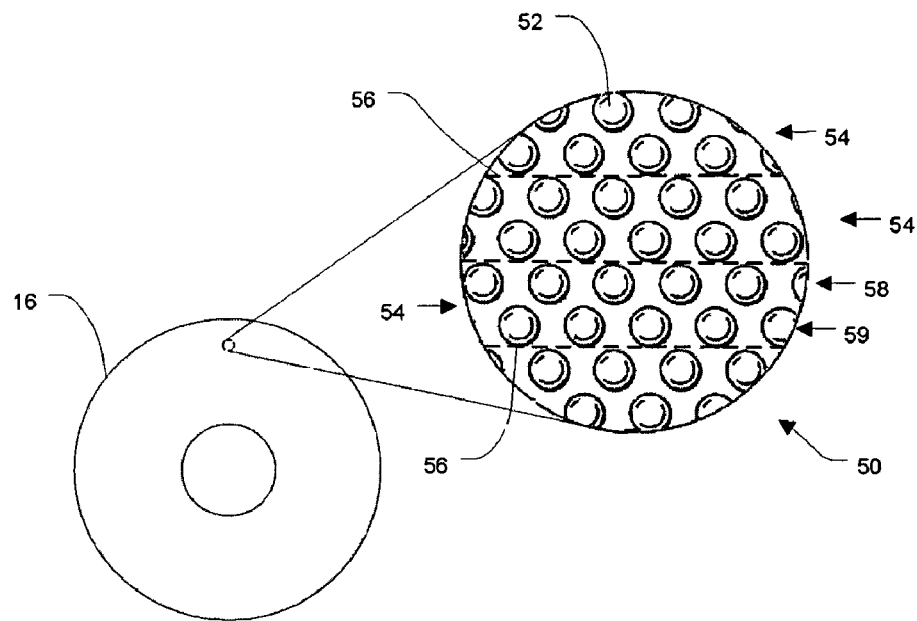
FIG. 2 is a top plan view of a data bit pattern and transducer head according to an embodiment of the present invention.

FIG. 2 is a top plan view of a magnetic storage disk 16 with an enlarged area illustrating a data bit pattern 50 according to some embodiments of the invention. The magnetic storage disk 16 is shown as a bit patterned medium, wherein the data bit pattern comprises a plurality of separate and discrete data bits 52 organized in a staggered bit pattern. The bit patterned medium generally includes a non-magnetic substrate with an overlying magnetic recording layer with perpendicular anisotropy, along with one or more interlayers between the substrate and the magnetic layer according to some embodiments. The magnetic layer is patterned to form the discrete and separate data bits 52, through, for example, lithographic patterning or self-organizing nanoparticle arrays. In some embodiments, the magnetic storage disk 16 is DC erased before it is mounted within the magnetic storage device.

The data bits 52 extend around the disk 16 and are divided into a plurality of data arrays 54, which in the illustrated embodiment take the form of concentrically spaced data tracks (depicted in FIG. 2 by dashed lines 56), generally perpendicular to the radius of the disk. Although the data arrays 54 comprise concentric data tracks in the magnetic storage medium in this embodiment, it should be appreciated that the data arrays may have alternate configurations and geometries. As just one example, in some applications the data arrays 54 may be formed as one or more substantially straight rows of data bits. Returning to FIG. 2, each data array 54 in this embodiment comprises a plurality of staggered data bits 52 extending around the disk. The data arrays 54 comprise a staggered, two-bit wide bit pattern, each data array having at least a first group 58 of data bits and a second group 59 of data bits. For example, with reference to FIG. 2, the first group 58 comprises a group of outer diameter (OD) data bits and the second group 59 comprises a group of inner diameter (ID) data bits.

The data arrays 54 are further organized into one or more data sectors having a plurality of recording bits magnetized by the transducer 30 to record data. The term "recording bit" is used herein to describe such bits in which the transducer, e.g., read/write head, can repeatedly record and/or overwrite data, such as, for example, the data routed to a storage device from a computer operating system (sometimes referred to herein as "user data"). In contrast, position information may initially be recorded in a "servo" sector or servo bits, but is usually not repeatedly recorded and/or overwritten in servo bits in the same way as data is recorded in the recording bits. Although the data arrays 54 in FIG. 2 are depicted as being two bits wide, it is contemplated that the arrays may also be wider than two bits according to some embodiments.

Figure 3:
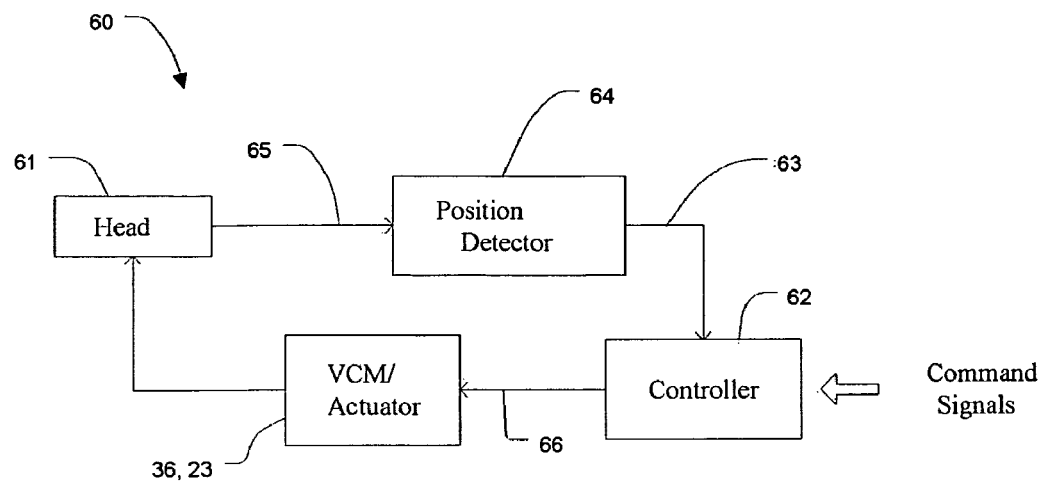
FIG. 3 is a block diagram of servo control system according to an embodiment of the present invention.

FIG. 3 shows a functional block diagram of a servo control system 60 which provides positional control for a transducer such as a read and/or write head 61. The servo control system 60 includes a controller 62 (e.g., a digital signal processor) which receives command signals from a host system (e.g., personal computer) and one or more position signals 63 from a servo position detector 64. The position detector 64 receives a readback signal 65 from the head 61 from which it extracts or generates the one or more position signals 63 according to some embodiments of the invention. The controller 62 processes the one or more position signals 63 and any command signals from the host system and sends a corresponding control signal 66 to the VCM 36 to move the actuator 23 and head 61.

Figure 4:
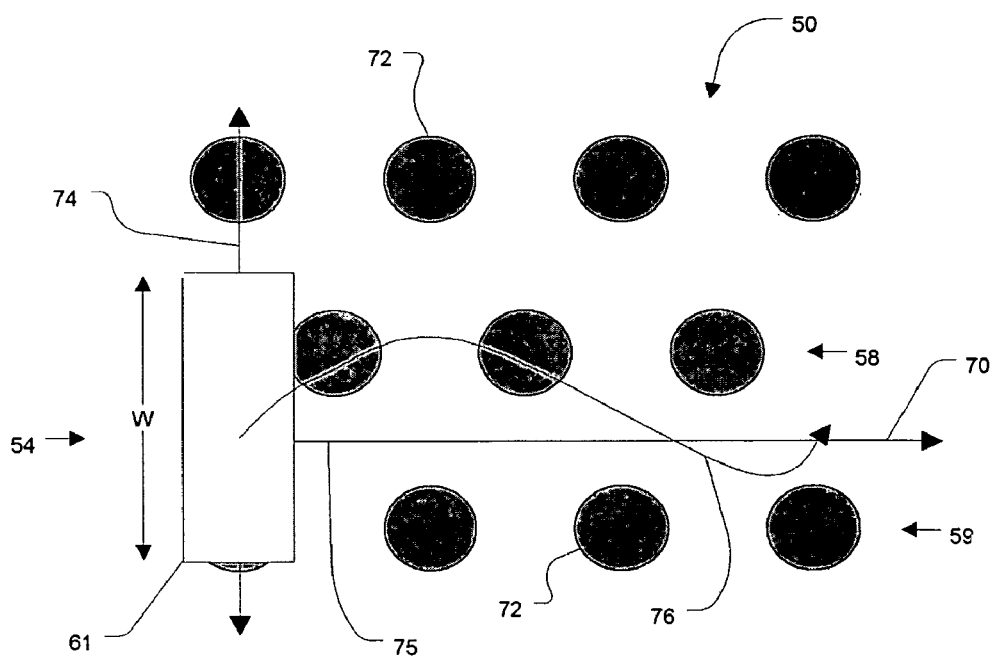
FIG. 4 is a top view of a magnetic storage medium illustrating a data bit pattern according to an embodiment of the present invention.

FIG. 4 is a top plan view of the head 61 positioned adjacent one data array 54 (e.g., data track) in a user data sector on the magnetic storage disk 16 shown in FIG. 2. The head 61 reads and/or writes user data to the data array 54 in a downtrack direction 70 as the magnetic storage disk 16 and data array 54 rotate past the head 61. As is shown in FIG. 4, the head 61 has a sufficient width, W, to read and/or write user data to recording bits 72 across the width of the data array 54, which in this embodiment is two recording bits 72 wide. The head 61 also moves via the actuator 23 across the data arrays 54 along a crosstrack path 74, between the inside diameter and outside diameter of the disk 16.

The head 61 needs to be positioned over the centerline of the data array 54 as it flies down the array in order to effectively sense the magnetic fields emanating from the recording bits 72 and/or to adequately induce a magnetic field in a particular recording bit 72 in the array. However, because the head freely floats above the array, the position of the head 61 tends to easily deviate from the array centerline. In this embodiment, where the data arrays include data tracks, the deviation can be caused by external or internal disturbances or track placement errors in the patterned tracks. If the head 61 deviated far enough, the head 61 would be unable to sense the magnetic field generated by some of the recording bits 72 in the data array or would be unable to induce the desired field in the appropriate recording bits 72.

As previously discussed, many magnetic recording media are patterned with dedicated servo burst patterns in order to provide feedback for maintaining the position of the head. According to embodiments of the invention, the readback signal from the head, which indicates the user data stored in the data array, can also be processed to indicate the off-track position of the head. Accordingly, embodiments of the invention obviate the need for dedicated servo burst patterns on the magnetic storage medium. Thus costs associated with media patterning are reduced and the total area available for data storage is increased because the head's position can be determined as user data is read from the array.

Referring to FIG. 4, as the head 61 flies over the data array 54, it generates a readback signal dependent upon the data pattern stored in the recording bits 72 passing by the head. The readback signal directly indicates the off-track position of the head 61, i.e., the head's position with respect to a centerline 75 of the data array 54. For example, with reference to FIG. 4, the readback signal indicates the head's off-track position as the head 61 moves along a path 76 deviating from the centerline 75. Although FIG. 4 simply illustrates the head 61 moving relative to the stationary data array 54, it will be appreciated that the relative movement between the head 61 and the data array 54 in this embodiment including a disk drive configuration may actually occur because of track eccentricity or runout introduced during the disk manufacturing process and/or disturbances encountered in the operating environment.

According to the embodiment shown in FIGS. 3 and 4, the readback signal 65 comprises a first group of responses induced in the head 61 by the first group 58 of recording bits and a second group of responses induced in the head 61 by the second group 59 of recording bits. As the head 61 moves away from the centerline 75 of the data array 54 towards the first group 58, the responses in the readback signal 65 due to the first group 58 increase in magnitude, while the responses from the second group 59 decrease in magnitude. A similar, but opposite, effect occurs when the head 61 moves away from the first group 58 towards the second group 59.

Thus, the responses in the readback signal 65 from the first and second groups of recording bits comprise head position information that the position detector 64 uses to generate the one or more position signals 63 for the servo control loop 60. In one embodiment a position error signal (PES) is generated based on the extracted position signals. Advantageously, the position information is extracted from the native bit pattern 50 of the recording bits 72, illustrated as a staggered dot array in the embodiments of FIGS. 2 and 4. Thus the need for dedicated servo data sectors containing servo burst patterns is minimized or eliminated in some embodiments.

Because the position information comes directly from the native bit pattern 50, it can be monitored for lengths of the data array 54 that exceed to varying degrees the capability of, for example, dedicated PES burst patterns. For example, position information can be extracted along a length of an entire user data sector along the data array 54. The position information can then be subsampled, advantageously providing a control signal with a high signal to noise ratio (SNR) while maintaining sample rate and sufficient information for servo control.

Figure 5:
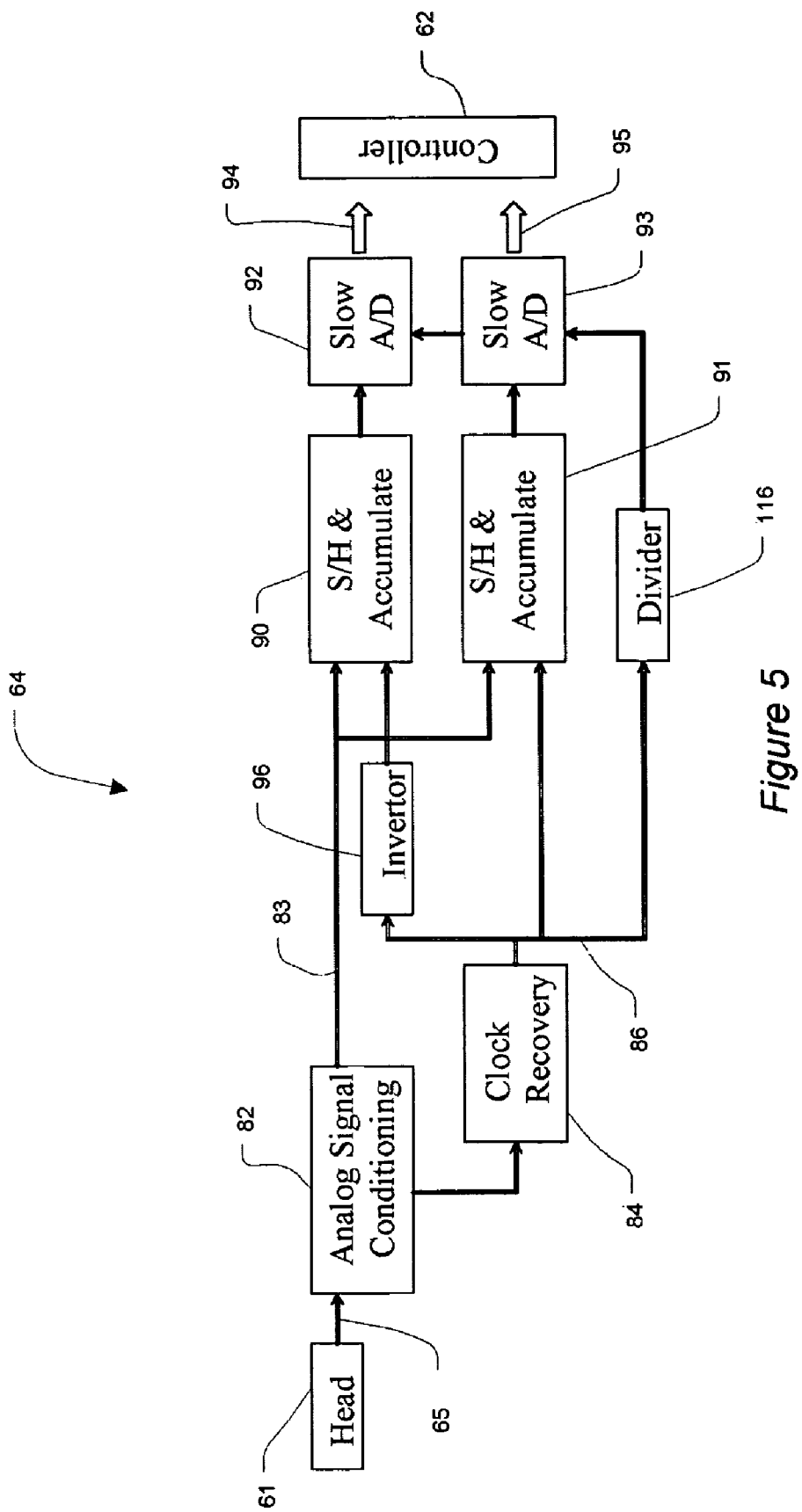
FIG. 5 is a block diagram of a servo position detector according to an embodiment of the present invention.

FIG. 5 illustrates one embodiment of the servo position detector 64 for extracting position information from the readback signal 65. The illustrated position detector 64 receives the readback signal 65 from the head 61, extracts the position information, and passes it on to the controller 62, which then operates the actuator 23 to reposition the head 61 accordingly.

The depicted servo position detector 64 includes an analog signal conditioning circuit 82 (ASC) comprising, for example, a continuous time filter and automatic gain control, that accepts the readback signal 65 and outputs a conditioned readback signal 83. In one embodiment, the ASC 82 also includes a rectifier for rectifying the readback signal 65 before sending it to a clock recovery circuit 84 and circuitry for extracting the position information.

Figure 7:
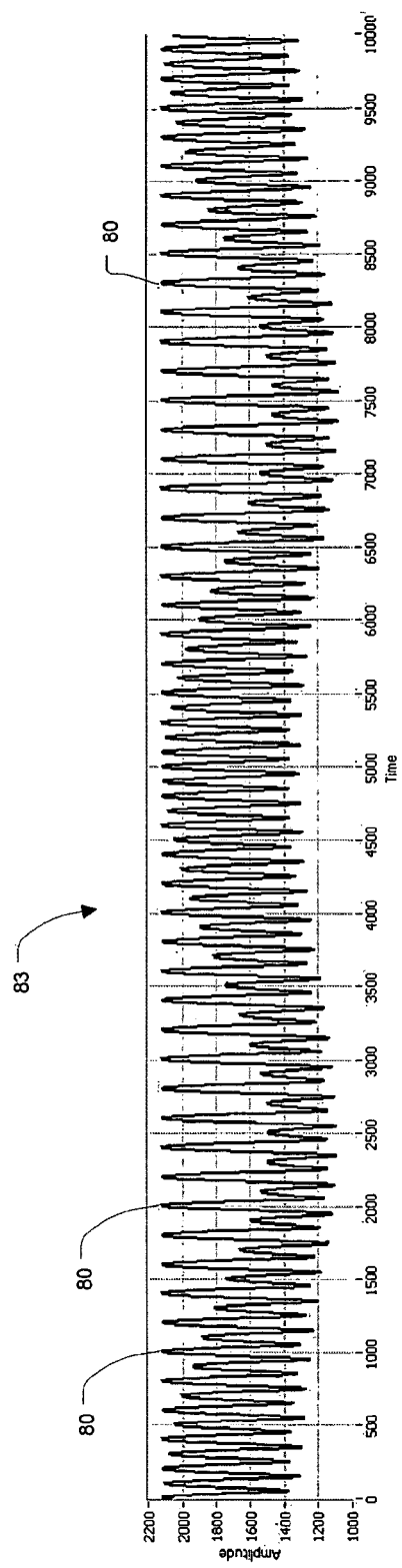
FIG. 7 is a representation of a simulated readback signal after passing through a signal conditioning unit according to an embodiment of the present invention.

FIG. 7 shows a simulation of the conditioned readback signal 83 from the head 61 as the head travels over the data array 54 of FIG. 4 according to one embodiment. In this embodiment, the simulation assumes the data array 54, e.g., data track, has 0.2 tracks of eccentricity or runout. The magnitudes of the individual responses 80 correspond to individual recording bits 72 in the staggered bit pattern 50. FIG. 7 shows the conditioned readback signal 83 generated from recording bits 72 of the same polarity. However, in some embodiments some of the individual responses 80 have opposite polarities (from oppositely polarized recording bits 72), which the ASC full-wave rectifies for clock recovery and position information extraction.

In one embodiment the clock recovery circuit 84 comprises a phase locked loop (PLL) that locks on to the phase and frequency of the readback signal 65 to provide a clock signal 86. Referring to FIG. 5, the clock signal 86 drives circuitry for extracting the position information from the conditioned readback signal 83. In the embodiment shown, the clock signal 86 drives both a first and a second sample, hold, and accumulate (SHA) circuit 90, 91, and a first and a second analog-to-digital converter (ADC) 92, 93, which process the conditioned readback signal 83 and output a first position signal (PS1) 94 and a second position signal (PS2) 95.

Figure 8:
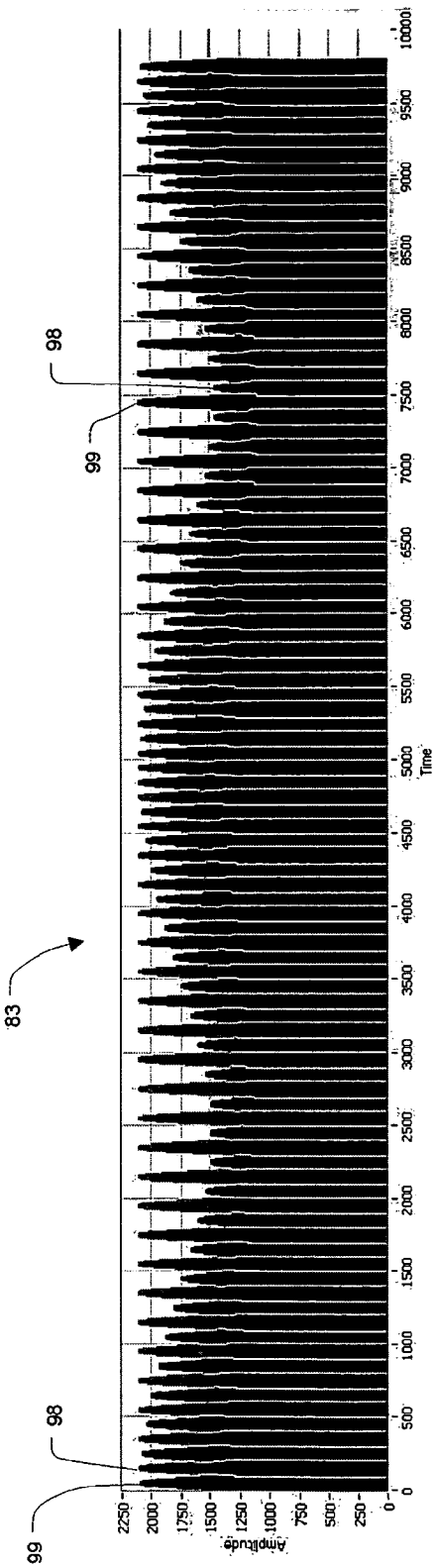
FIG. 8 is a windowed representation of the readback signal of FIG. 7 that is passed to a sample, hold, and accumulate circuit according to an embodiment of the present invention.

The first and second SHA circuits 90, 91 selectively sample the readback signal 65 to extract responses from the first and second groups 58, 59 of staggered recording bits in order to generate PS1 94 and PS2 95, respectively. FIG. 8 illustrates the conditioned readback signal 83 ready to be sampled by the first and second SHA circuits 90, 91.

Referring to FIGS. 5 and 8, an inverter 96 inverts the clock signal 86, which drives the first SHA circuit 90. According to one embodiment, the first SHA circuit 90 samples the conditioned readback signal 83 and extracts and accumulates the first group of alternating responses 98. For example, the first SHA circuit 90 begins sampling the conditioned readback signal 83 on rising edges of the inverted clock signal, holds the sampled responses on falling edges, and accumulates the sampled responses 98 during a predetermined accumulation window.

Figure 9:
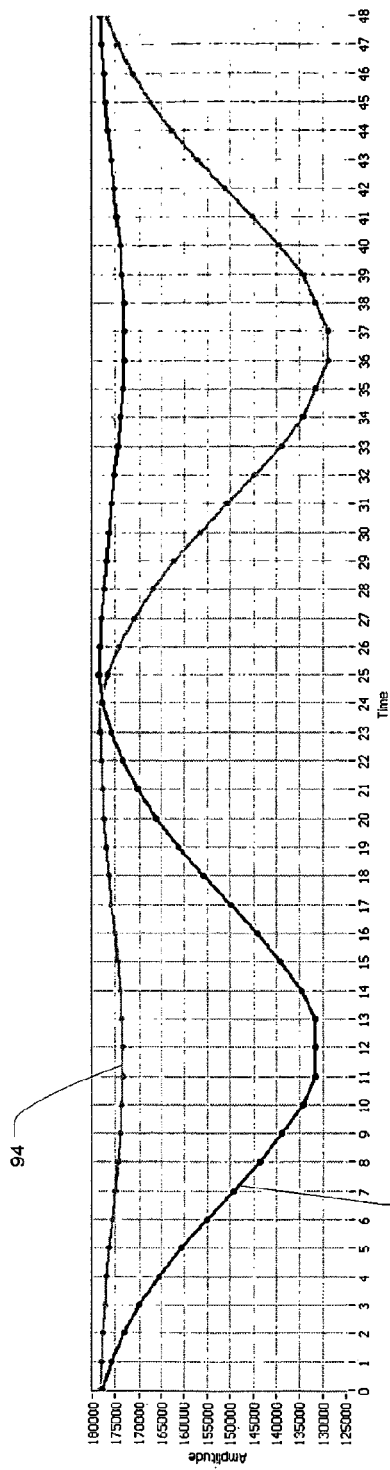
FIG. 9 is a representation of position signals based on the signal of FIG. 8 according to an embodiment of the present invention.

At the end of each accumulation window, the first SHA circuit 90 presents the accumulated value to the first ADC 92 and then resets to accumulate sampled responses during the next accumulation window. The first ADC 92 generates PS1 94 by converting the accumulated analog values to digital values. FIG. 9 illustrates PS1 94 generated according to one embodiment.

The second SHA circuit 91 selectively samples the conditioned readback signal 83 in a similar fashion. Driven by the noninverted clock signal, the second SHA circuit 91 samples the conditioned readback signal 83 and extracts and accumulates the group of alternating responses 99 from the second group 59 of recording bits during the accumulation window. The accumulated values are converted to digital values by the second ADC 93 to generate PS2 95. FIG. 9 illustrates PS2 95 generated according to one embodiment.

The first and/or second SHA circuits 90, 91 can include digital and/or analog circuitry to perform the sample, hold, and accumulate functions. For example, in one embodiment, multiple Atmel TS83102G0B ADCs can be interlaced to yield a high enough sample rate and can be used as sample and hold devices whose outputs are multiplexed to an ASIC device that performs the accumulation for a programmed accumulation window.

Figure 6:
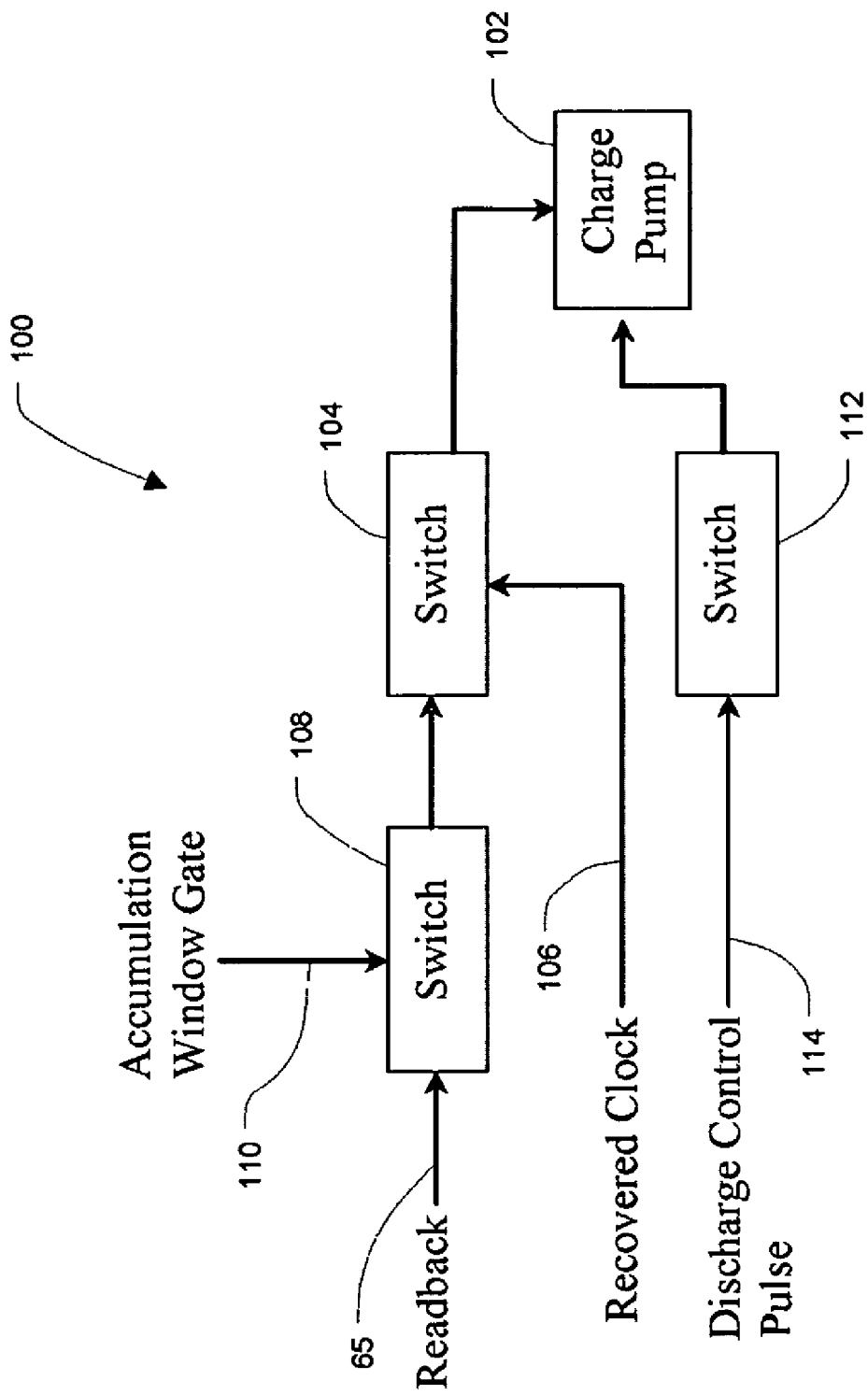
FIG. 6 is a block diagram of a charge pump circuit according to an embodiment of the present invention.

Referring to FIG. 6, in one alternative embodiment in the analog domain, the first and/or second SHA circuits 90, 91 could include a charge pump circuit 100. As shown, the charge pump circuit 100 could be enabled and/or disabled and discharged through analog switches. For example, multiple radio frequency (RF) switches, such as, for example Analog Device's ADG902 switch, can be used for controlling the charging and discharging of a charge pump 102. In the configuration illustrated in FIG. 6, a first switch 104 driven by the recovered clock signal 106 can sample the readback signal 65 and charge the charge pump 102. A second switch 108 driven by an accumulation gate signal 110 from the controller 62 can enable sampling for the duration of the accumulation window. A third switch 112 can discharge the charge pump 102 at the end of the accumulation window upon receiving a discharge control pulse 114 from the controller. Prior to discharging, the accumulated responses built up in the charge pump 102 can be sent to one of the ADCs 92, 93.

The accumulation window is determined in one embodiment of the invention by synchronization marks on the magnetic storage disk 16. The synchronization marks may take a variety of useable forms. As one example, one or more radial lines of missing data bits can be included in the bit pattern to re-synchronize the accumulation windows at regular intervals. In another embodiment the synchronization marks comprise a graycode encoded in the data arrays at regular intervals.

As shown in FIGS. 8 and 9, the accumulation window is essentially set to sample and individually accumulate the response for each consecutive recording bit in the first and second groups 58, 59 of recording bits. In other embodiments a longer accumulation window enables the position detector 64 to accumulate the responses from several recording bits at a time. For example, the accumulation period may correspond to uniform disk segments similar in length to servo sectors used in some magnetic recording disks. According to some embodiments, the accumulation window may be up to five hundred (500) bits or longer. A longer accumulation window can advantageously provide greater noise reduction for the position detector 64, as well as increased insensitivity to accumulation window jitter, clock jitter, skew, and bit placement errors in the downtrack direction.

Referring to FIG. 5, the position detector 64 includes a clock divider 116 according to one embodiment. The divided clock signal drives the first and second ADCs 92, 93, controlling the sampling rate used to generate PS1 and PS2, respectively. Referring to FIG. 9, PS1 94 and PS2 95 are illustrated as generated with a clock divider set to unity. Thus, PS1 94 and PS2 95 include data points for each of the alternating recording bits 72. In alternate embodiments, the divider is set to a value greater than unity to enable the first and second ADCs 92, 93 to subsample the accumulated values. As just one example, depending on the sample rate requirements and track misregistration budget requirements in a disk drive configuration, this subsampling can be by as much as a factor of one hundred, although other values are possible.

Figure 10:
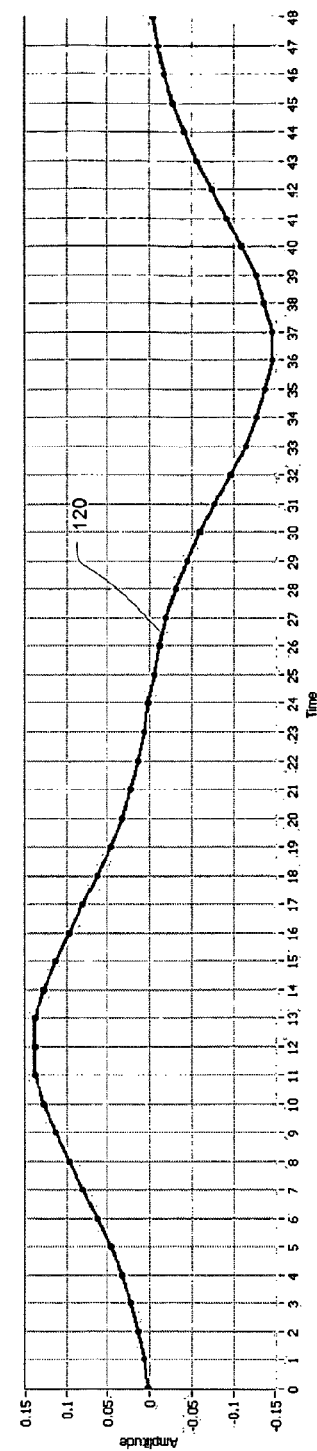
FIG. 10 is a representation of a position error signal based on the position signals of FIG. 9 according to an embodiment of the present invention.

FIG. 10 illustrates a position error signal (PES) 120 representing the head's displacement from the array centerline 75 as it moves over the data array, e.g., data track, with a track eccentricity of 0.2 tracks. In this embodiment, the controller is programmed to generate the PES 120 according to the relationship PES=(PS1−PS2)/(PS1+PS2). However, the controller may be programmed to use other calculations for the PES according to different embodiments. One additional benefit of this embodiment is that the data track (i.e., data array) width is also fundamentally the servo track width which makes the linearization process simpler when compared to disk drive linearization schemes where the data track is typically half as wide as the servo track.

The PES 120 indicates the magnitude and direction of the displacement of the head 61 from the array centerline 75. As will be appreciated, in this embodiment, a larger amplitude indicates a greater displacement from the array centerline 75. A positive amplitude represents movement of the head 61 towards the first group 58 of recording bits 72 (e.g., the outside diameter of the array), while a negative amplitude represents movement of the head 61 towards the second group 59 of recording bits (e.g., the inside diameter of the array). In one embodiment the directionality of the PES is ensured by patterning the recording bits 72 such that the responses sampled with the inverted and noninverted clock signals respectively correspond with the first group 58 and the second group 59 of recording bits. For example, the first recording bit 72 at the beginning of the accumulation window, and all of the odd recording bits afterward may belong to the second group 59 of recording bits. Likewise, the second, and all of the even recording bits, may belong to the first group 58 of recording bits.

Thus the position detector 64 processes the readback signal 65 from the head 61 to detect a fine position of the head with respect to the centerline of a desired data array. The position detector illustrated in FIG. 5 is one possible embodiment and is not intended to limit the configuration of the servo position detector. It will be appreciated that multiple schemes are available for extracting the position information and generating corresponding position signals such as PS1 94, PS2 95, and/or the PES 120.

In addition to centering the head over the data array, the servo control system also provides coarse position information to ensure that the read and/or write head is adjacent the desired data array. For example, in one embodiment, each data array includes an array identifier, such as a graycode, and the servo controller can be programmed to interpret the response received from the array identifiers. Thus the head can be positioned adjacent the desired data array using coarse position information during a seek operation and the fine position information from the position signals can be used during a subsequent track or array following operation.

Figure 11:
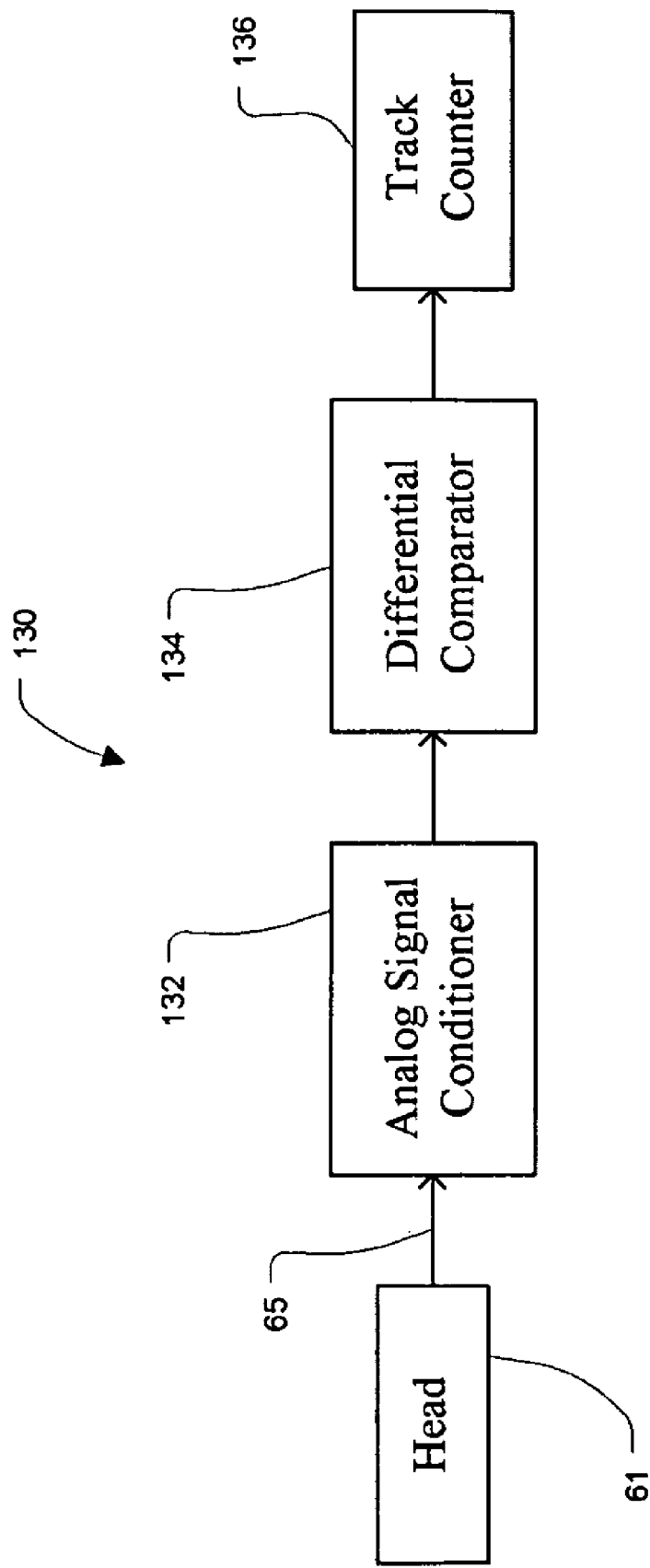
FIG. 11 is a block diagram of an array counting circuit according to an embodiment of the present invention.

In some embodiments, however, it may be desirable to avoid the use of dedicated graycodes in order to increase the data density of the magnetic storage medium. FIG. 11 is a block diagram of an array counting circuit 130 according to an embodiment of the present invention. The array counting circuit 130 can work in parallel with the position detector 64 to respectively determine the coarse and fine position of the head 61.

As shown in FIG. 11, the same readback signal 65 used in determining the head's fine position is routed from the head 61 to an ASC 132, which may or may not be the same ASC 82 in the position detector 64. The readback signal 65 is conditioned and fed to a comparator circuit 134 which compares the magnitude of the readback signal to a predetermined crossing threshold. When the magnitude of the readback signal meets the threshold, the comparator triggers a counter 136. For example, with respect to FIG. 4, moving along the crosstrack path 74 to the next adjacent data array toward the outer diameter of the disk is registered by detecting a lowered signal magnitude due to the reduced signal contribution from the second group 59 of recording bits (the ID bits).

Thus, a method of moving the head 61 (i.e., transducer) position relative to the data arrays 54 of the magnetic storage disk 16 includes moving the transducer across the data arrays and triggering the counter 136 as the head 61 crosses the data arrays. After reaching a predetermined limit on the counter 136 indicating the desired data array, the controller stops the head 61 adjacent the desired data array. The servo control system can then enter a track or array following mode where it monitors the fine position of the head with respect to the centerline of the data array as previously discussed.

The array counting circuit 130 is initialized in one embodiment by bringing the head 61 to a predetermined zone, such as the outer stop 32 shown in FIG. 1. A position identifier, for example, a graycode or synchronization mark, provides the circuit with its initial position. The array counting circuit 130 can then increment and/or decrement its counter 136 as it moves from array to array.

Thus, embodiments of the present invention are disclosed. Although the present invention has been described in considerable detail with reference to certain disclosed embodiments, the disclosed embodiments are presented for purposes of illustration and not limitation. The implementations described above and other implementations are within the scope of the following claims.

What is claimed is:

1. A method, comprising generating a readback signal from a magnetic storage medium including a magnetic layer patterned to form at least one data array including a plurality of discrete and separate recording bits forming at least a two-bit wide staggered bit pattern, wherein the readback signal is dependent upon the plurality of recording bits of the at least one data array.

2. The method of claim 1, further comprising:
generating at least first and second position signals from the readback signal; and extracting from the readback signal the first group of responses for generating the at least first position signal and the second group of responses for generating the at least second position signal;
wherein the plurality of recording bits includes first and second groups of recording bits respectively including first and second groups of responses in the readback signal.

3. The method of claim 2, wherein the magnetic storage medium includes a disk, and wherein the first group of recording bits includes outer diameter recording bits and the second group of recording bits includes inner diameter recording bits.

4. The method of claim 2, further comprising accumulating, during an accumulation window, the first group of responses resulting in a first accumulated value and the second group of responses resulting in a second accumulated value.

5. The method of claim 4, wherein the accumulation window includes a length of a user data sector along the at least one data array.

6. The method of claim 4, wherein the magnetic storage medium includes a disk, and further comprising rotating the disk with respect to the transducer and wherein the accumulation window includes at least one revolution of the disk.

7. The method of claim 4, further comprising accumulating the first and second groups of responses during a plurality of accumulation windows and wherein generating the at least first and second position signals respectively includes digitizing the first and second accumulated values with first and second analog-to-digital converters.

8. The method of claim 7, further comprising subsampling the first and second accumulated values with the first and second analog-to-digital converters.

9. The method of claim 2, further comprising generating a position error signal based on the at least first and second position signals.

10. A method comprising:
generating at least first and second position signals based on a magnetic storage medium including a magnetic layer patterned to form a plurality of data arrays including a plurality of discrete and separate recording bits forming at least a two-bit wide staggered bit pattern, wherein the first and second position signals are dependent upon the plurality of recording bits of a desired data array; and
moving a transducer to the desired data array based on the first and second position signals.

11. The method of claim 10, wherein each data array includes an array identifier, and further comprising reading the array identifier from each of the plurality of data arrays as the transducer moves across the plurality of data arrays.

12. The method of claim 10, further comprising triggering a counter as the transducer moves across the plurality of data arrays.

13. The method of claim 12, wherein the plurality of recording bits in each data array include inside recording bits and outside recording bits respectively inducing first and second groups of responses in the readback signal, and further comprising triggering the counter in response to one of the first and second group of responses meeting a predetermined threshold.

14. A storage medium comprising a magnetic layer patterned to form at least one data array including a plurality of discrete and separate recording bits forming at least a two-bit wide staggered bit pattern.

15. An apparatus comprising:
said storage medium of claim 14;
a transducer positioned adjacent the at least one data array for generating a readback signal dependent upon the plurality of recording bits of the at least one data array;
an actuator coupled to the transducer for moving the transducer relative to the at least one data array; and
a servo control system coupled between the transducer and the actuator, comprising:
a position detector that generates at least first and second position signals based on the readback signal; and
a controller that controls movement of the actuator based on the at least first and second position signals;
wherein the plurality of recording bits includes first and second groups of recording bits respectively inducing first and second groups of responses in the readback signal, and wherein the at least first and second position signals are based on the first and second groups of responses, respectively.

16. The apparatus of claim 15, wherein the first group of recording bits includes outer diameter recording bits and the second group of recording bits includes inner diameter recording bits.

17. The apparatus of claim 16, wherein the plurality of recording bits includes a staggered bit pattern greater than two bits wide.

18. The apparatus of claim 15, wherein the position detector includes first and second sample, hold, and accumulate circuits for respectively generating the at least first and second position signals.

19. The apparatus of claim 18, wherein the position detector further includes at least first and second analog-to-digital converters for respectively digitizing the output of the first and second sample, hold, and accumulate circuits.

20. The apparatus of claim 15, wherein the controller generates a position error signal based on the at least first and second position signals.

* * * * *